(12) United States Patent
Joseph

(10) Patent No.: US 10,473,173 B2
(45) Date of Patent: Nov. 12, 2019

(54) BRAKE DISC WITH SYMMETRIC GROOVE PATTERN

(71) Applicant: DISC BRAKES AUSTRALIA PTY LIMITED, Silverwater (AU)

(72) Inventor: Phillip Joseph, Blakehurst (AU)

(73) Assignee: DISC BRAKES AUTRALIA PTY LIMITED, Silverwater NSW (AU)

( * ) Notice: Subject to any disclaimer, the term of this patent is extended or adjusted under 35 U.S.C. 154(b) by 0 days.

(21) Appl. No.: 15/936,710

(22) Filed: Mar. 27, 2018

(65) Prior Publication Data

US 2018/0231080 A1    Aug. 16, 2018

Related U.S. Application Data

(63) Continuation of application No. 15/094,268, filed on Apr. 8, 2016, now Pat. No. 9,933,030, which is a
(Continued)

(30) Foreign Application Priority Data

Dec. 22, 2010   (AU) ................................ 2010257364

(51) Int. Cl.
*F16D 65/12* (2006.01)
*F16D 65/00* (2006.01)
(Continued)

(52) U.S. Cl.
CPC ....... *F16D 65/127* (2013.01); *F16D 65/0006* (2013.01); *F16D 65/12* (2013.01);
(Continued)

(58) Field of Classification Search
CPC .... F16D 65/127; F16D 65/12; F16D 65/0006; F16D 2065/1304; F16D 2065/1328; F16D 2066/001; F16D 2069/004
(Continued)

(56) References Cited

U.S. PATENT DOCUMENTS 3,056,380 A    10/1962   White
4,286,694 A    9/1981    Wiseman et al.
(Continued)

FOREIGN PATENT DOCUMENTS

CN    1312896 A      9/2001
CN    201031899 Y    3/2008
(Continued)

OTHER PUBLICATIONS

Chinese Office Action dated May 4, 2015 for Application No. CN 201180068277.2.
(Continued)

*Primary Examiner* — Thomas W Irvin

(74) *Attorney, Agent, or Firm* — Ladas & Parry LLP

(57) ABSTRACT

A brake disc for a wheeled vehicle; said brake disc including opposing annular braking surfaces; each of said surfaces provided with an identical pattern of disparate arcuate groove segments; said groove segments arranged in groups oriented in both clockwise and anti-clockwise directions; each of said groups including, one series of at least two arcuate groove segments lying along a common are extending from proximate a hub of said braking surface to proximate the periphery of said braking surface, one inward arcuate groove segment extending from proximate said hub to a point intermediate said hub and said periphery, and one outward arcuate groove segment extending from a point intermediate said hub and said periphery to proximate said periphery.

11 Claims, 11 Drawing Sheets

Related U.S. Application Data continuation of application No. 13/997,028, filed as application No. PCT/AU2011/001660 on Dec. 22, 2011, now Pat. No. 9,765,834.

(51) Int. Cl.
*F16D 65/02* (2006.01)
*F16D 66/00* (2006.01)
*F16D 69/00* (2006.01)

(52) U.S. Cl.
CPC .... *F16D 65/128* (2013.01); *F16D 2065/1304* (2013.01); *F16D 2065/1328* (2013.01); *F16D 2066/001* (2013.01); *F16D 2069/004* (2013.01); *Y10T 29/49995* (2015.01)

(58) Field of Classification Search
USPC .................. 188/218 XL, 264 A, 264 AA
See application file for complete search history.

(56) References Cited

U.S. PATENT DOCUMENTS

| | | | |
|---|---|---|---|
| 6,186,293 B1 | 2/2001 | Beer et al. |
| D459,282 S | 6/2002 | Oberti |
| D497,127 S | 10/2004 | Veneziano et al. |
| 6,805,909 B2 | 10/2004 | Martin |
| 7,073,650 B2 | 7/2006 | Fabricius et al. |
| 7,097,006 B2 | 8/2006 | Veneziano et al. |
| 7,097,010 B1 | 8/2006 | Hulten et al. |
| 7,219,777 B2 | 5/2007 | Lin |
| D565,487 S | 4/2008 | Zhang |
| 7,950,505 B2 | 5/2011 | Suppiah |
| D640,620 S | 6/2011 | Bielis et al. |
| D690,634 S | 10/2013 | Joseph |
| D691,528 S | 10/2013 | Joseph |
| 8,851,245 B2 | 10/2014 | Bielis et al. |
| 2001/0040077 A1 | 11/2001 | Qian et al. |
| 2003/0021975 A1 | 1/2003 | Martin |
| 2004/0040802 A1 | 3/2004 | Veneziano et al. |
| 2007/0000747 A1 | 1/2007 | Miyazaki |
| 2008/0041675 A1 | 2/2008 | Baumgartner et al. |
| 2008/0067018 A1 | 3/2008 | Smith et al. |
| 2012/0138397 A1 | 6/2012 | Bielis et al. |
| 2013/0008748 A1 | 1/2013 | Lembach et al. |

FOREIGN PATENT DOCUMENTS

| | | |
|---|---|---|
| JP | 61-112834 A | 5/1986 |
| WO | 2007/103150 A2 | 9/2007 |

OTHER PUBLICATIONS

Supplementary European Search Report (SESR) dated Mar. 22, 2018 for Application No. EP 11 85 0574.
Espacenet English abstract of FR 2561732 A1 which corresponds to JP 61-112834 A.
Espacenet English abstract of CN 201031899 Y.
Espacenet English abstract of GB 2340563 A which corresponds to CN 1312896 A.

BRAKE DISC WITH SYMMETRIC GROOVE PATTERN

RELATED APPLICATION

This application is a continuation of application Ser. No. 15/094,268 filed on Apr. 8, 2016, which is a continuation of application Ser. No. 13/997,028 filed on Aug. 7, 2013, which is a 371 of International Application PCT/AU2011/001660 filed on Dec. 22, 2011, which designated the U.S., the entire contents of each of which are incorporated herein by reference.

The present invention relates to discs for vehicle brakes and, more particularly, to groove segments provided in the braking surfaces of such discs.

BACKGROUND

Many arrangements of groove segments on the braking surfaces of the brake discs of vehicles are known. One such is that disclosed for example in U.S. Pat. No. 7,097,006, which itself references a large number of groove arrangements.

Groove segments are aids, in heat dissipation, stress relief and vibration reduction, and need to be tailored to the particular characteristics and construction of the disc to which they are applied.

A difficulty has been to derive a pattern of groove segments which meets these requirements but is also effective in a disc rotating in either clockwise or anti-clockwise directions so that the disc may be used on either side of a vehicle and provide balanced and equal braking performances regardless of the direction of rotation.

Furthermore, the configuration of the actual machined slot has implications for both the performance of the brake pads applied to the disc surfaces and the integrity of the disc itself. Thus some known slot configurations at least, have either a tendency to tearing of the rotor surfaces or to cause hairline crack development at the brake band peripheries, or both.

Another problem with conventional brake discs is that there is no way a motorist can monitor the braking performance of the braking assembly of the vehicle. Braking efficiency and problems of incompatibility between brake pads and the brake bands of the disc can be indicated by the temperature of the discs after heavy braking, but this temperature can only be ascertained by use of sophisticated thermal monitoring equipment.

It is an object of the present invention to address or at least ameliorate some of the above disadvantages.
Notes The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

In this specification:
"Arcuate groove" means a groove following an arc of a circle or other geometrically defined curve.
"Clockwise" and "anti-clockwise" refer to rotational directions about the centre of a brake disc as viewed from the outward side.

BRIEF DESCRIPTION OF INVENTION

Accordingly, in a first broad form of the invention, there is provide a brake disc for a wheeled vehicle; said brake disc including opposing annular braking surfaces; each of said surfaces provided with an identical pattern of disparate arcuate groove segments; said groove segments arranged in groups, each group including at least:

(a) a pair of inner arcuate groove segments extending outwardly from proximate an inner circumferential edge of a said brake band surface to proximate a mid portion of the width of said brake band, (b) a pair of outer arcuate groove segments extending outwardly from proximate a mid portion of the width of said brake band to proximate an outer circumferential edge of said brake band, and wherein said pair of inner arcuate groove segments and said pair of outer arcuate groove segments each include a clockwise arcing and an anticlockwise arcing groove segment; said brake disc providing identical braking performance independent of direction of rotation.

Preferably, each of said opposing braking surfaces includes four of said groups of arcuate groove segments; each said group occupying a quadrant of said brake disc.

Preferably, respective said clockwise arcing groove segment and anticlockwise arcing groove segment of each of said pair of inner arcuate groove segments and said pair of outer arcuate groove segments are disposed symmetrically about respective radial lines of symmetry.

Preferably, said clockwise arcing groove segment of said pair of outer groove segments is located along an arc defining said clockwise arcing groove segment of said pair of inner arcuate groove segments; said outer groove segment separated from said inner groove segment by a gap.

Preferably, said of each said arcuate groove segments arcs outwardly convexly.

Preferably, said pattern includes a pair of intermediate arcuate groove segments; said pair of intermediate arcuate groove segments disposed symmetrically about a radial line of symmetry.

Preferably, an anticlockwise arcing one of said pair of intermediate arcuate groove segments is located such that its midpoint lies on said arc defining said clockwise arcing groove segment of said pair of inner arcuate groove segments and at a midpoint of said gap separating said outer groove segment from said inner groove segment.

Preferably, a said radial line of symmetry of said pair of outer arcuate groove segments lies approximately 15 degrees advanced in a clockwise direction from a radial line of symmetry of said pair of inner arcuate groove segments.

Preferably, a said radial line of symmetry of said pair of outer arcuate groove segments lies approximately 30 degrees advanced from a radial line of symmetry of said pair of inner arcuate groove segments.

Preferably, a said radial line of symmetry of said pair of intermediate arcuate groove segments lies approximately midway between said radial lines of symmetry of said pair of inner arcuate line segments and said pair of outer arcuate line segments.

Preferably, said pair of inner arcuate groove segments is machined such that end portions of said groove segments adjacent an inner circumferential edge of said brake band surface gradually increase in depth.

Preferably, said pair of outer arcuate groove segments is machined such that end portion of said groove segments adjacent an outer circumferential edge of said brake band surface gradually increase in depth.

Preferably, distal ends of said pairs of inner and outer arcuate groove segments are machined such that said grooves are at full depth at said distal ends.

Preferably, both ends of said intermediate pairs of arcuate groove segments are machined such that said grooves are at full depth at said both ends.

Preferably, outer rims of brake bands forming said opposing annular braking surfaces are provided with at least one set of colour markings; said colour markings applied with thermally sensitive paints.

Preferably, said colour markings comprise stripes of said thermally sensitive paints extending from an edge of an inward facing said annular braking surface of an inner said brake band to an edge of an outward facing said annular braking surface of an outer said brake band.

Preferably, said stripes are of distinct colours; each said distinct colour changing colour according to a predetermined elevated temperature band.

In another broad form of the invention, there is provided a method of providing equal braking performance in a brake disc for a vehicle in both clockwise and anticlockwise rotation; said method including the steps of machining a repeating groove pattern in surfaces of opposing brake bands of said disc; each, of said repeating groove patterns including at least a pair of inner arcuate groove segments and a pair of outer arcuate groove segments; a first arcuate groove segment of each said pair arcing towards a mid portion of a said brake band in a clockwise direction; a second arcuate groove segment of each said pair arcing towards a mid portion of a said brake band in an anticlockwise direction.

Preferably, ends of said inner and outer arcuate groove segments adjacent respective inner and outer peripheries of said brake band surfaces are machined so as to gradually reach full depth as machining proceeds away from said inner and outer peripheries.

Preferably, distal ends of said inner and outer arcuate groove segments are machined such that said groove segments remain at said full depth at said distal ends.

In yet another broad form of the invention, there is provided a pattern of grooves provided in opposing annular brake band surfaces of a disc brake disc; said pattern comprising three sets of arcuate grooves arranged radially around each of said opposing brake band surfaces; each set of said three sets of arcuate grooves including four pairs of radially distributed arcuate grooves, grooves of each said pair of arcuate grooves extending symmetrically in clockwise and anticlockwise directions about a respective radial line of four radial lines of said set; said four radial lines defining four equal annular portions of said brake band surface.

Preferably, grooves of said first set arc convexly from an inner periphery of a said brake band to at least a mid portion of said brake band surface.

Preferably, said four radial lines for said second set of arcuate grooves are rotationally offset in a clockwise direction relative orientation of said four radial lines for said first set of arcuate grooves; said rotational offset approximately 30 degrees; said offset such that each said arcuate groove of said second set lies substantially on a continuation of an arc defined by a corresponding arcuate groove of said first set.

Preferably, grooves of said second set arc convexly from an outer periphery of a said brake band towards respective outer ends of said arcuate grooves of said first set; each respective outer end of an arcuate groove of said second set separated from a corresponding outer end of a corresponding arcuate groove of said first set by a gap.

Preferably, said four radial lines for said third set of arcuate grooves are rotationally offset in an anticlockwise direction relative orientation of said four radial lines for said first set of arcuate grooves; said rotational offset approximately 30 degrees; said offset such that each said arcuate groove of said third set extends through said gap between outer ends of corresponding arcuate grooves of said first set and said second set; midpoints of said arcuate grooves of said third set proximate said arcs defined by arcuate grooves of said first set.

Preferably, each said arcuate groove of said third set arcs convexly from a first end proximate a mid portion of said brake band surface to a second end towards an outer periphery of said brake band.

Preferably, said first ends of said arcuate grooves of said third set lie at a smaller radial distance from a centre of said disc than a radial distance of outer ends of said arcuate grooves of said first set.

Preferably, said second ends of said arcuate grooves of said third set lie at a greater radial distance from said centre of said disc than a radial distance of outer ends of said arcuate grooves of said second set.

In another broad form of the invention, there is provided a brake disc for a wheeled vehicle; said brake disc including opposing annular braking surfaces; each of said surfaces provided with an identical pattern of disparate arcuate groove segments; said groove segments arranged in groups; each group including at least:
  (a) a pair of inner arcuate groove segments extending outwardly from proximate an inner circumferential edge of a said brake band surface to proximate a mid portion of the width of said brake band,
  (b) a pair of outer arcuate groove segments extending outwardly from proximate a mid portion of the width of said brake band to proximate an outer circumferential edge of said brake band, and
wherein said pair of inner arcuate groove segments and said pair of outer arcuate groove segments each include a clockwise arcing and an anticlockwise arcing groove segment; said brake disc providing identical braking performance independent of direction of rotation; said brake disc further provided with at least one set of temperature sensitive coloured markings at the periphery of said brake disc; respective ones of said coloured markings changing colour at a predetermined band of elevated temperature of said brake disc.

BRIEF DESCRIPTION OF DRAWINGS

Embodiments of the present invention will now be described with reference to the accompanying drawings wherein.

DETAILED DESCRIPTION OF PREFERRED EMBODIMENTS

First Preferred Embodiment

Figure 1:
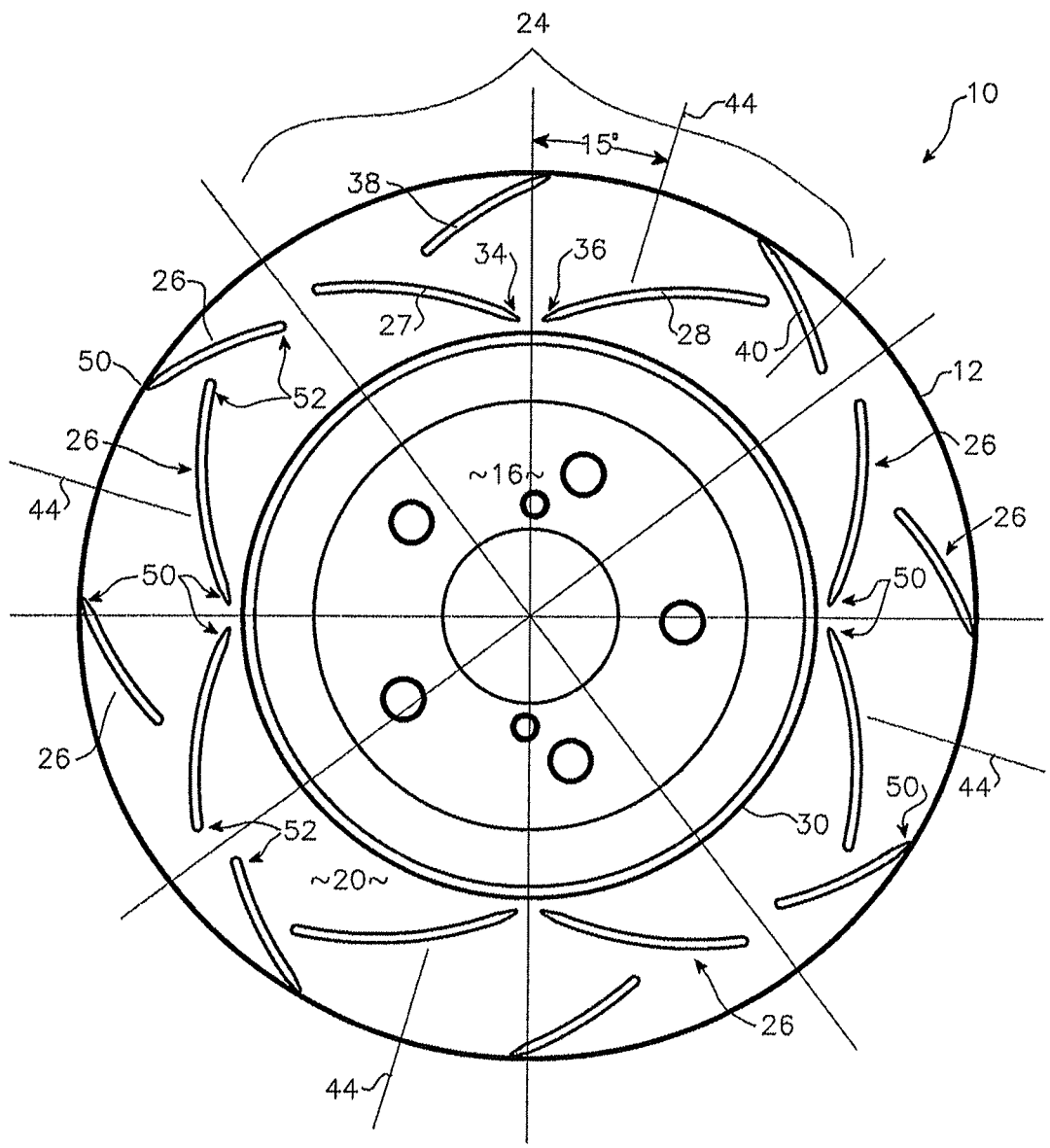
FIG. 1 is an orthogonal side view of one side a brake disc provided with patterns of arcuate groove segments according to a first preferred embodiment of the invention.
Figure 2:
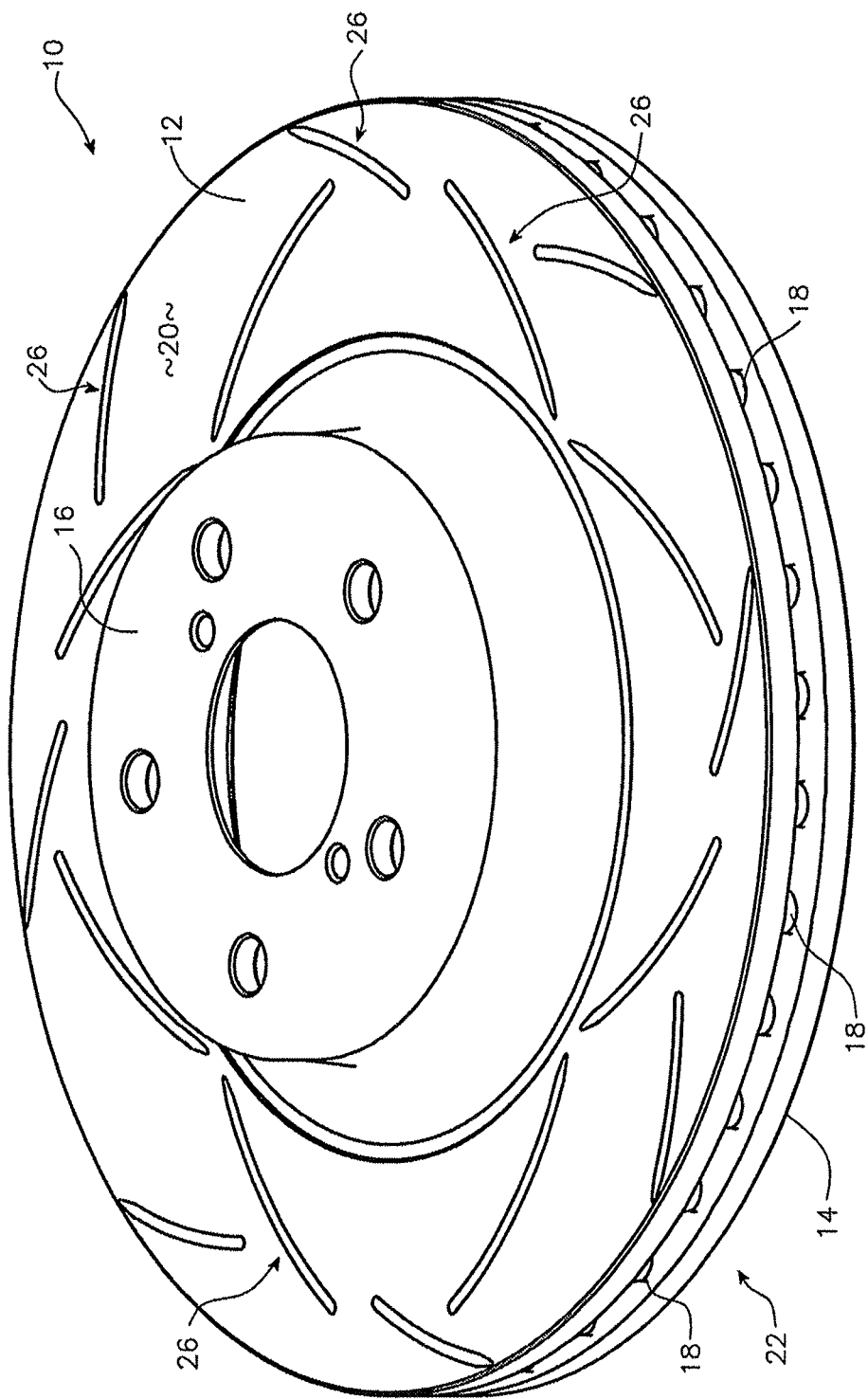
FIG. 2 is a perspective view of the brake disc of FIG. 1.

With reference to FIGS. 1 and 2, a brake disc 10 comprises opposing annular brake bands 12 and 14 supported by a central hub 16. Brake bands 12 and 14 may form the outer surfaces of a solid disc or, as shown in FIG. 2, comprise two discs interconnected by arrays of pillars 18 which allow air flow between the brake bands, as well known in the art.

Each outer surface 20 and 22 of the brake bands 12 and 14 is provided with groups 24 of arcuate groove segments 26, machined into the respective outer surfaces. Preferably, the groove segments 26 are approximately 3 mm in width with a depth of approximately 1.5 mm.

The following description refers to the surface 20 of brake band 12 as shown in FIG. 1, but it will be understood that the identical arrangement of groove segments is applied to the surface 22 of the opposite brake band 14. Preferably the patterns on the two opposing sides are rotationally offset by 30 degrees.

Each group 24 of arcuate groove segments 26 of this preferred embodiment of the invention, comprises arcuate groove segments oriented in both clockwise and anti-clockwise directions. The groups are four in number and occupy 90 degree quadrants of the brake band surface 20.

Each group includes one pair of inner arcuate groove segments 27 and 28, extending outwardly from proximate the inner circumferential edge 30 of the brake band surface 20, across approximately three quarters of the width, or at least past the mid portion, of the brake band. Groove segments 27 and 28 are disposed about a radial line of symmetry. 32, and arc convexly in opposing clockwise and anticlockwise directions, with their inner termini 34 and 36 adjacent the radial line of symmetry 32.

Each of the groove segments 27 and 28 is associated with one of a pair of outer shorter arcuate groove segments, 38 and 40 respectively. The first of these, shorter groove segment 38, extends outwardly from proximate the mid portion of the width of the brake band surface 20 and arcs, also convexly, in a clockwise direction to a point at the periphery 42 of the brake band surface 20, and proximate the radial line of symmetry 32 of groove segments 27 and 28.

The second shorter groove segment 40 is equal in extent to the first shorter groove segment 38, but arcs convexly in the opposite anticlockwise direction. The two shorter groove segments 38 and 40 are symmetrical about a radial line of symmetry 44 advanced approximately 15 degrees in a clockwise direction from the radial line of symmetry 32 of the pair of inner groove segments 27 and 28.

This pattern of groove segments 26 is repeated for each quadrant of the brake bands 12 and 14.

Second Preferred Embodiment

Figure 3:
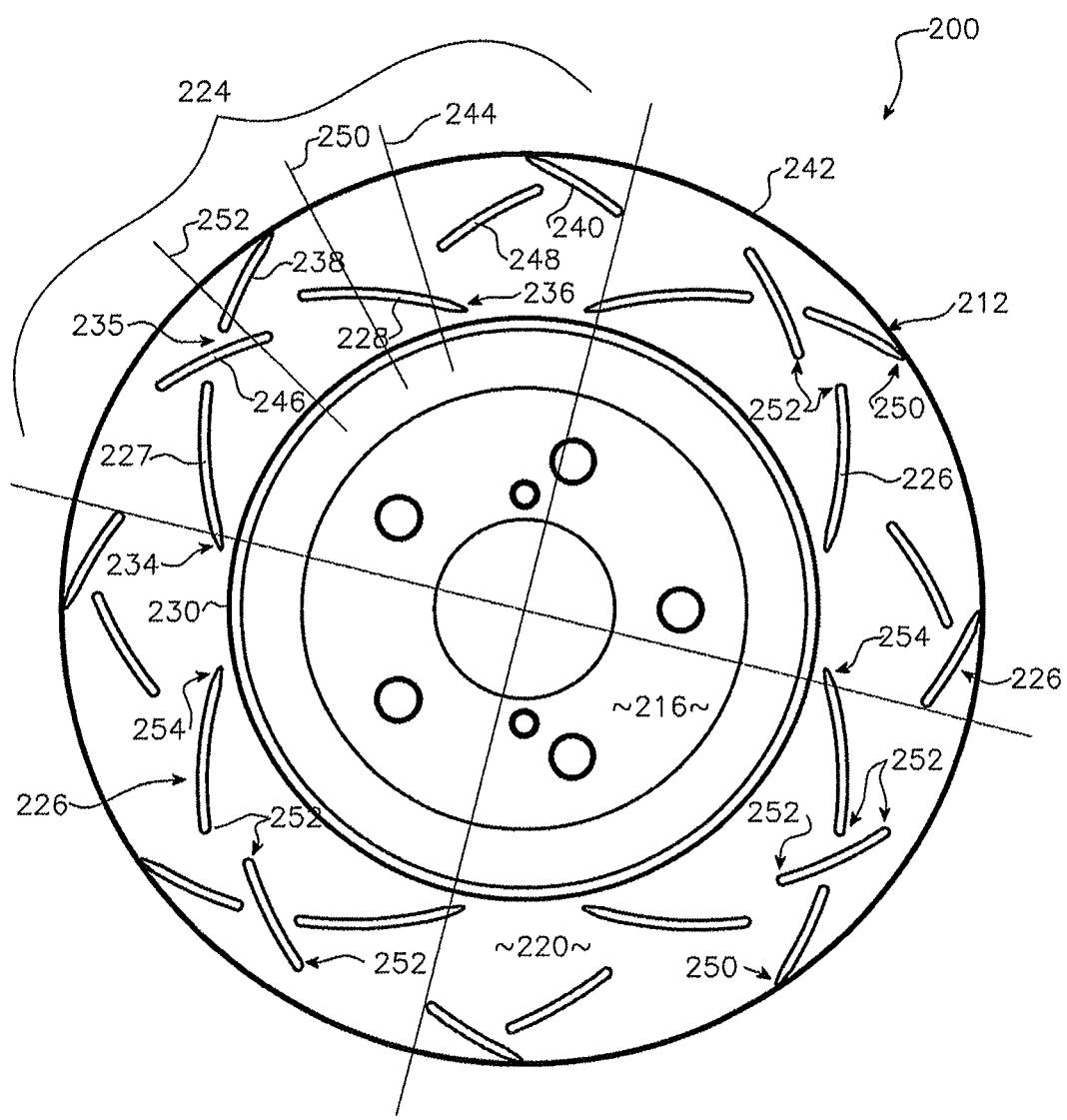
FIG. 3 is an orthogonal side view of one side of a brake disc provided with patterns of arcuate groove segments according to a second preferred embodiment of the invention.
Figure 4:
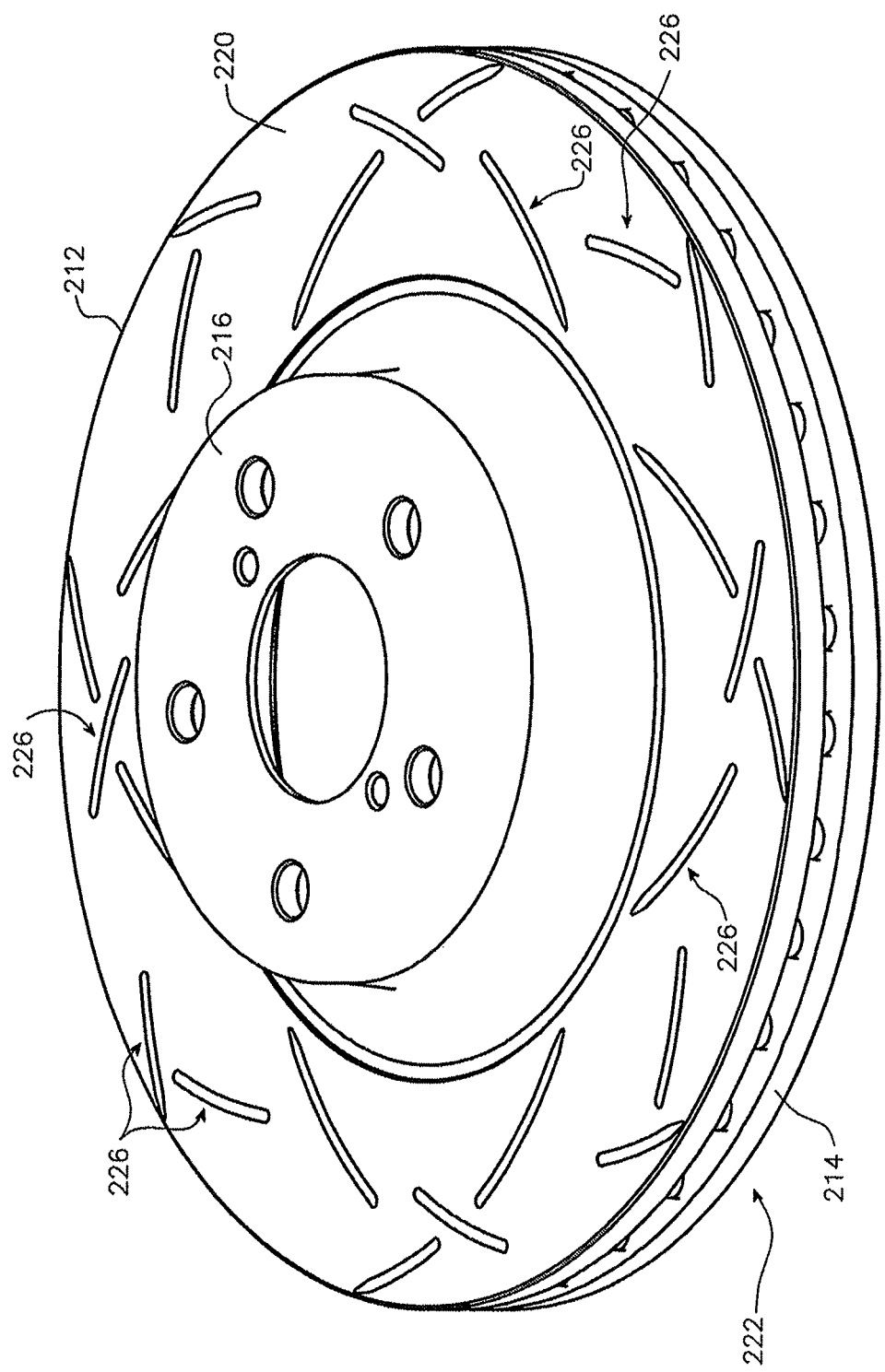
FIG. 4 is a perspective view of the brake disc FIG. 3.

In a second preferred embodiment of the invention and with reference now to FIGS. 3 and 4, a similar brake disc 100 as previously described above is similarly provided with an arrangement of groove segments 226, identical on each opposing brake band 212 and 214.

The groove segments 226 are arranged also in four repeating groups 224 of groove segments; each group 224 thus occupying a 90 degree quadrant of a brake band surface 220 and 222. For convenience of description, each quadrant may be divided into three sectors of approximately 30 degrees. Each group 224 includes a pair of innermost groove segments 227 and 228 disposed symmetrically about a first 30 degree radial line of symmetry 232, and have their inner termini 234 and 236 adjacent the inner circumferential edge 230 of the brake band. These inner groove segments extend outwardly, convexly clockwise and anticlockwise respectively, to approximately three quarters of the width of the brake band surface 220.

In this embodiment, the pattern also includes a pair of clockwise and anticlockwise outer groove segments 238 and 240 respectively, symmetrical about the second 30 degree radial line of symmetry 244. The preferred arrangement is such that the first of these outer groove segments, the clockwise groove segment 238, lies on the arc of clockwise inner groove segment 227, being separated from the distal end of that groove segment by a gap 235. Each of these outer groove segments 238 and 240 extends approximately the outer one third of the width of the brake band, with their distal termini proximate the outer periphery 242 of the brake band surface 220.

Each quadrant 224 includes one further pair of clockwise and anticlockwise intermediate groove segments 246 and 248 respectively. Intermediate groove segments 246 and 248 are disposed symmetrically about a radial line of symmetry 250 lying approximately midway between the lines of symmetry 232 and 244 of the pairs of inner and outer groove segments respectively. The arrangement is such that the anticlockwise intermediate groove segment 246 passes through the gap 235 and such that its midpoint lies on the arc defining the previously described inner groove segment 227 and outer groove segment 238.

It can be seen that each of the embodiments described above provides for an equal number and total lengths of clockwise and anticlockwise arcuate groove segments on each brake band of the brake disc. This allows the discs to be equally effective in braking regardless of the direction of rotation of the disc.

Figure 7:
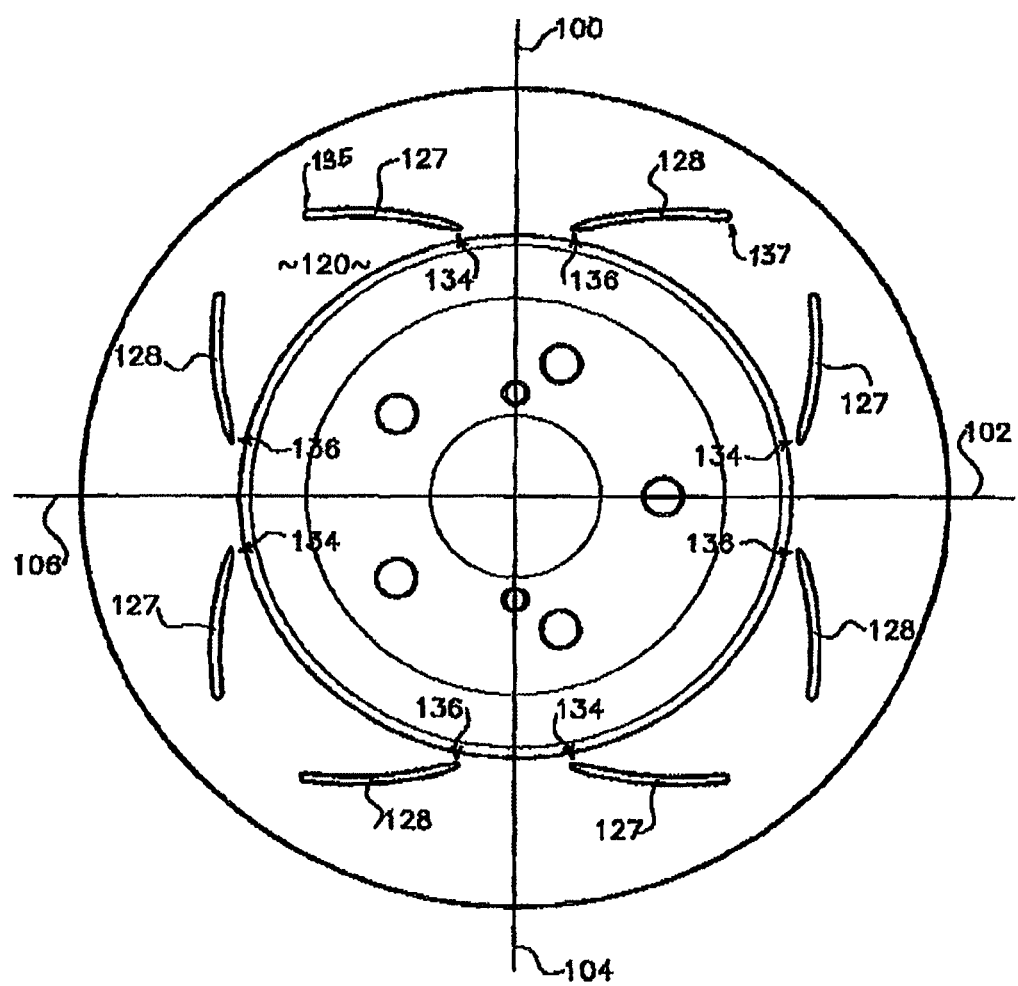
FIG. 7 is a view of a first set of groove segments forming a part of the groove pattern of the second preferred embodiment of the invention.
Figure 8:
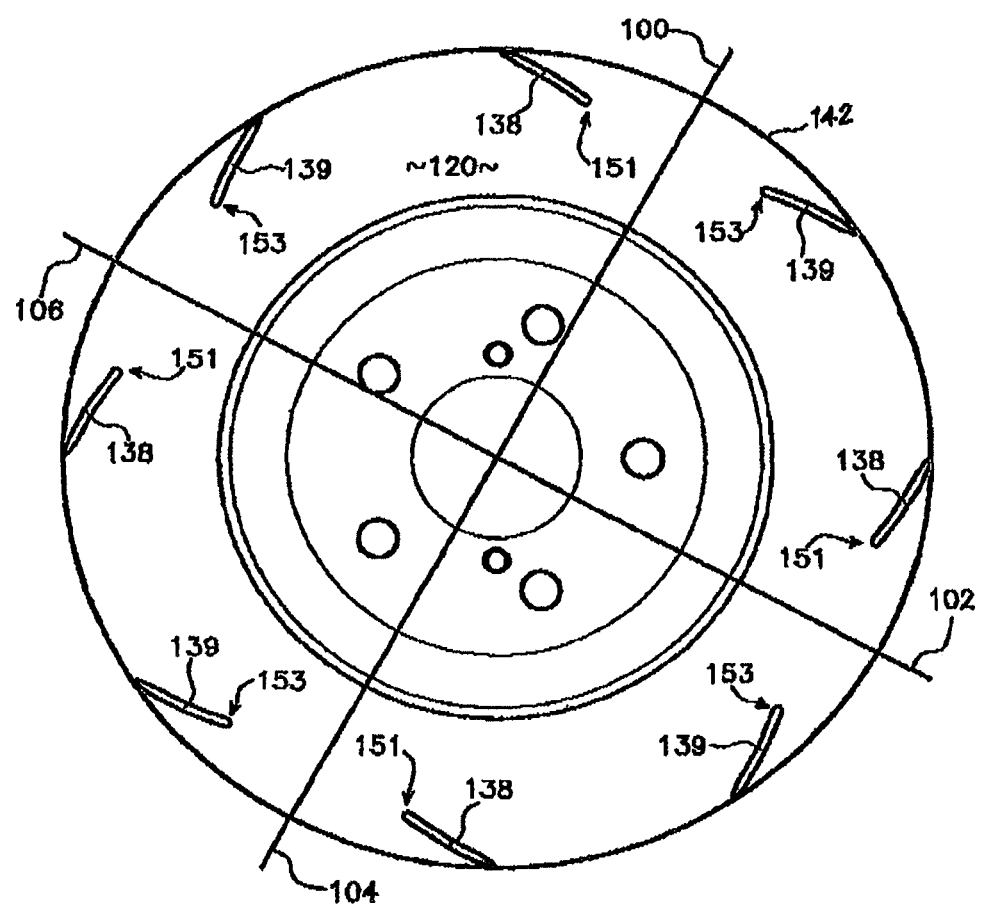
FIG. 8 is a view of a second set of groove segments forming a part of the groove pattern of the second preferred embodiment of the invention.
Figure 9:
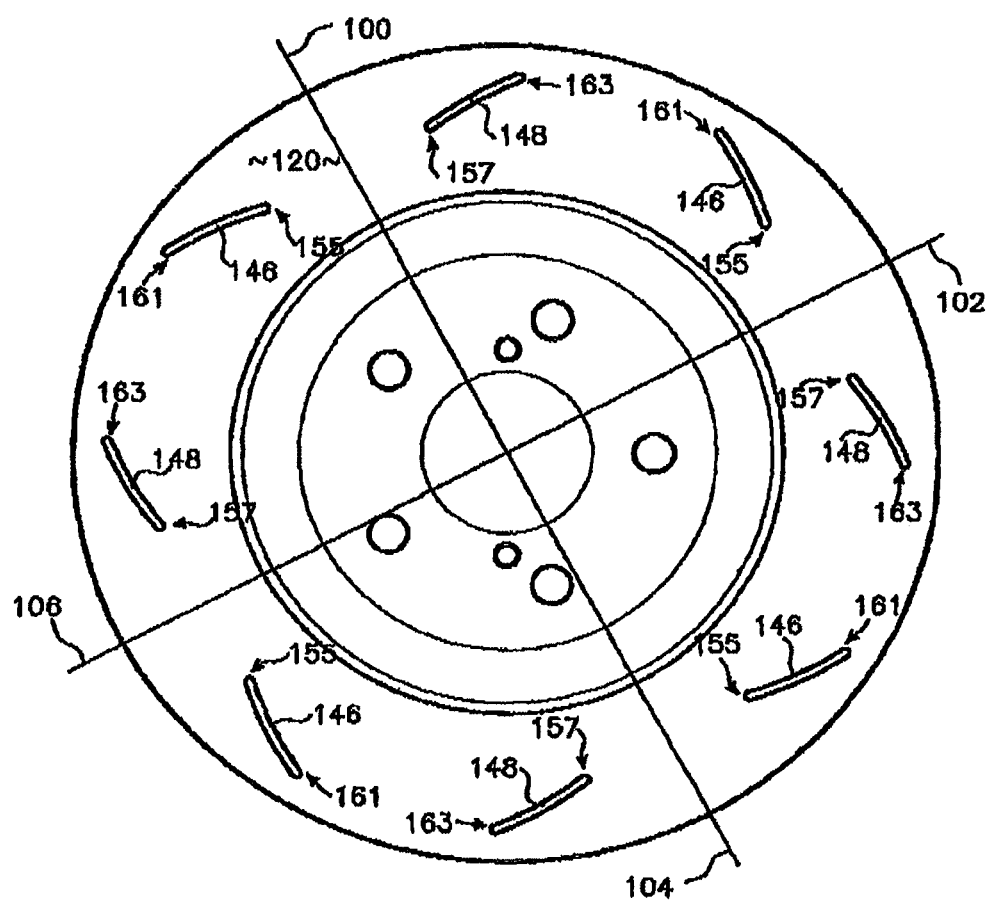
FIG. 9 is a view of a third set of groove segments forming a part of the groove pattern of the second preferred embodiment of the invention.

The pattern of arcuate grooves of this second embodiment, may alternatively be described as a combination of the patterns of three sets of grooves. With reference to FIGS. 7 to 9, each of the three sets can be described with reference to four radial lines (100, 102, 104 and 106) (with specific relative orientation for each set) which define four equal annular portions of the brake band surface (120); that is adjoining pairs of these four radial lines subtend right angles.

Each of the three sets of arcuate grooves comprises four pairs of grooves, in which each pair comprises a clockwise groove and an anticlockwise groove arranged symmetrically about a radial line.

Figure 10:
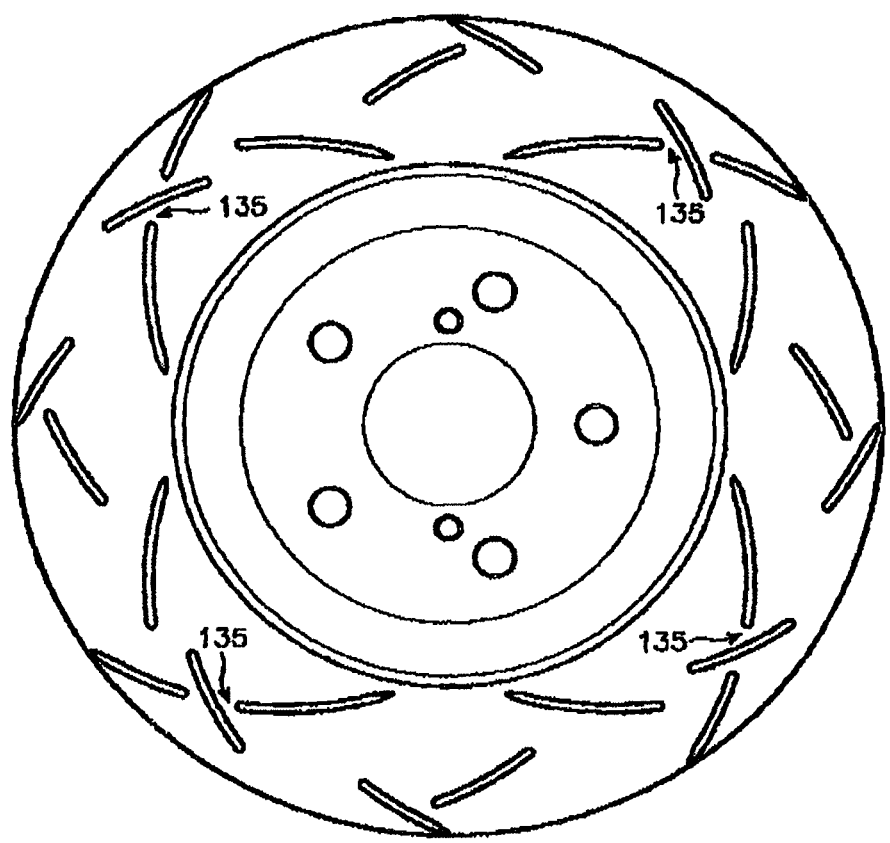
FIG. 10 shows the complete pattern of groove segments according to the second preferred embodiment of the invention as formed by the combination of the sets of groove segments of FIGS. 7 to 9.
Figure 11:
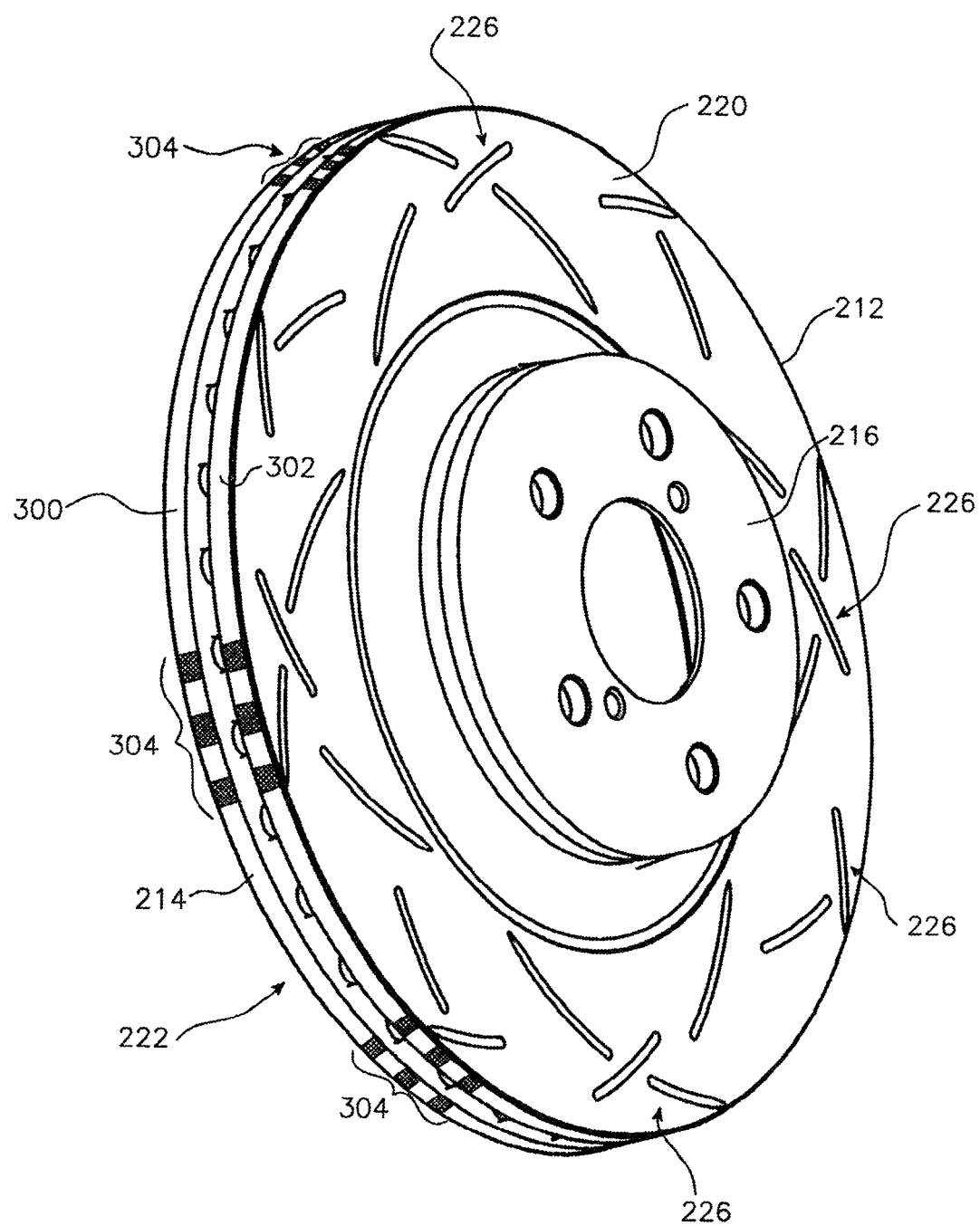
FIG. 11 is a general perspective view of brake disc according to the invention showing thermal indicating markings on outer rims of the brake bands of the brake discs in a further preferred embodiment of the invention.

With reference now to FIGS. 7 and 10, in the first set of the three sets of arcuate grooves, each pair of arcuate grooves (127, 128) arc convexly (clockwise and anticlockwise) from proximate an inner periphery (130) of the brake band to outer ends (135, 137), somewhat past a mid portion of the brake band surface (120).

As can be seen in Figures s and 10, the four radial lines for the second set of pairs of arcuate grooves (138, 139) are rotationally offset in a clockwise direction relative the orientation of the four radial lines for the first set of arcuate grooves. This rotational offset is approximately 28 degrees, and is such that each clockwise arcuate groove of this second set lies substantially on a continuation of an arc defined by a corresponding clockwise arcuate groove of the first set, as can be seen in FIGS. 3 and 10.

The pairs of arcuate grooves (138, 139) of the second set arc convexly from proximate the outer periphery (142) of the brake band, towards the respective outer ends (135, 137) of the arcuate grooves (127, 128) of the first set. The respective outer ends (151, 153) of the arcuate grooves (138, 139) of this second set are separated from the corresponding outer ends (135, 137) of the first set by gaps (135) as can be seen in FIGS. 3 and 10.

With reference now to FIGS. 9 and 10, the four radial lines (100, 102, 104 and 106) for the third set of pairs of arcuate grooves (146, 148) are rotationally offset in an anticlockwise direction relative to their original orientation for the first set of arcuate grooves (127, 128) as shown in FIG. 7. In this case the rotational offset is approximately 28 degrees, with the offset such that each of the anticlockwise arcuate groove of the pair of grooves (146, 148) of this third set extends through a gap (135) between the outer ends of corresponding arcuate grooves of the first set (127, 128) and the second set (138, 139). The midpoints of these arcuate grooves (146, 148) of the third set lie approximately on the arcs defined by the arcuate grooves (127; 128) of the first set. Each pair of arcuate grooves (146, 148) of the third set arcs convexly from first ends (155, 157) proximate a mid portion of said brake band surface, to second ends (161, 163) towards the outer periphery (242) of the brake band.

FIG. 10 shows the three sets of arcuate grooves combined now to form the complete pattern of grooves on the brake band surface.

It can be seen that the grooves of the three sets are arranged so that there is at least some overlap of the grooves. That is, there is no annular band of the surface of the brake bands which is not interrupted by the grooves of at least one of the sets of grooves. Thus the first ends (155, 157) of the arcuate grooves of the third set lie at a smaller radial distance from the centre of the disc than the radial distance of outer ends (135, 137) of the arcuate grooves (127, 128) of said first set, so that these ends overlap radially.

Similarly, the second ends (161, 163) of the arcuate grooves (146, 148) of the third set, lie at a greater radial distance from the centre of the disc than the radial distance of the outer ends (151, 153) of the arcuate grooves (138, 139) of the second set, again providing an overlap.

Third Preferred Embodiment

In a further preferred embodiment according to the invention, the brake rotor brake bands and grooving conforms to the that described in either of the above first and second embodiments. In this preferred embodiment however, the outer rims (300, 302) of the brake bands are provided with at least one set (304) of colour markings as indicated in FIG. 10.

Preferably, each set (304) of the at least one set, comprises a painted stripe extending transversely from the edge of the outward facing surface of the outer brake band (302) to the edge of the inward facing surface of the inner brake band (300).

Preferably also, the sets (304) of colour markings are regularly arranged around the circumference of the brake disc and are sufficient in number such that at least one set will be visible to an observer regardless of the position the brake disc has assumed when the vehicle to which it is fitted has come to rest.

Figure 12:
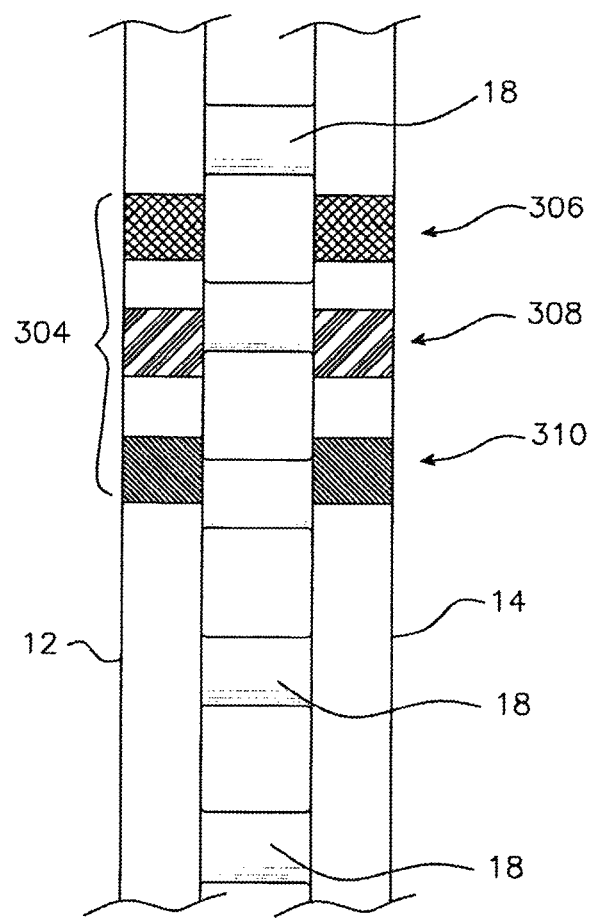
FIG. 12 is an enlarged view of a set of the thermal markings of FIG. 11.

In a preferred arrangement as shown in FIG. 12, each set (304) is comprised of three spaced apart painted stripes (306), (308) and (310). The colours are distinct one from the other so as to be readily distinguishable and are preferably green, orange and red with all the sets repeating the pattern of colours in the same order.

The paints used for the stripes (306,308,310) are thermally sensitive paints which react to elevated temperatures in the metal to which they have been applied and react by changing to different colours when the temperature of the supporting surface reaches predetermined elevated temperature bands.

Preferably, in the present embodiment of the invention, the green paint of stripe (306) changes to white in the temperature band of 458° C. to 856° C., the orange stripe (308) changes to yellow between 550° C. and 1022° C., while the red stripe (310) also changes to white between 630° C. and 1166° C.

The brake disc of the present embodiment is supplied together with a colour interpretation chart (not shown) so that the vehicle owner or operator can refer to the chart and compare the current colour of the stripes with that of the chart. The chart may additionally contain information as to possible interpretations of the current colour of a disc under different braking conditions as an aid to assessing braking performance.

Groove Machining

In each of the above embodiments, the arcuate groove segments are machined in a particular way. Typically grooves machined in disc surfaces are introduced into the disc material by a gradual plunging of the ball cutter tool as it is moves along the trajectory of the groove path, and exits in a similar way by gradually retracting the tool tip as it approaches the end of the groove path.

In grooves which end at some intermediate point on the disc brake band, that is in the area of maximum applied force by the brake callipers, such "feathered" groove ends tend to react adversely with the brake pad, in some cases causing a tearing of the disc material. Nevertheless, feathered or gradually produced groove ends are advantageous for those groove ends close to either the outer or inner peripheries of the brake band, in that they reduce the possibility of hair line fractures developing between the groove end and the disc periphery. These areas close to the inner and outer peripheries of the brake band surface are in any case not swept by the brake pads.

Figure 5:
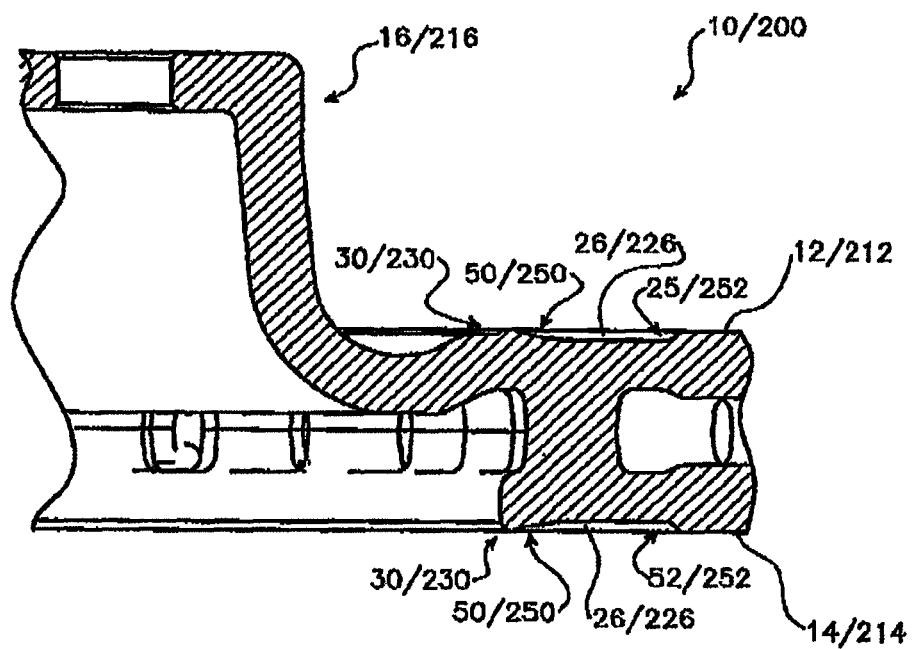
FIG. 5 is a partial cross section of the brake disc of FIG. 1 and FIG. 3 showing the machining pattern of groove segments adjacent the inner peripheries of the brake band surfaces.
Figure 6:
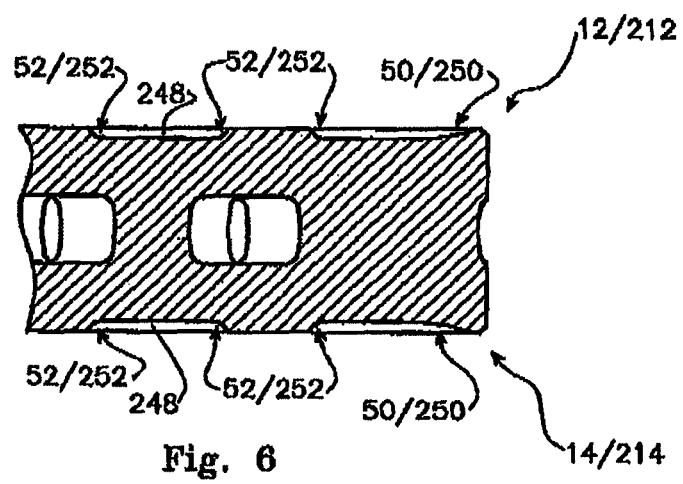
FIG. 6 is a partial cross section of the brake disc of FIG. 1 and FIG. 3 showing the machining pattern of groove segments adjacent the outer periphery of the brake band surfaces and groove segments at an intermediate position.

It can be seen, particularly in FIGS. 5 and 6, that the grooves of the present invention retain the advantages of feathered ends 50 of groove ends at both the inner periphery 30 and the outer periphery 42 (in FIG. 1) and feathered ends 254 of groove ends at both the inner and outer peripheries 230 and 242 (in FIG. 3). However the distal ends (52 and 252 respectively) of these grooves are not feathered. Nor are both ends of the intermediate grooves 246 and 248 so feathered.

In both embodiments of the invention, the preferred machining method for groove ends adjacent to the brake band surface peripheries, is to gradually introduce the tool tip (preferably an 80 degree 5 mm ball cutter) into the disc material as the tool moves away from the periphery along the groove path until the required depth is reached, then machine in towards the middle portion of the brake band. When the distal end of the groove path is reached, tool motion parallel to the disc surface is arrested and the tool withdrawn from the groove. Preferably, the ball cutter is plunged into the disc surface to a maximum depth at which the groove width at the surface is 3 mm.

The grooves machined in this way thus have full groove depth substantially up to the ends (52/252) of the grooves in the middle portion of the brake bands, and tests have indicated that this groove end configuration eliminates the problem of disc material tearing. At the same time the method retains the advantages associated with a feathered groove end configuration at the brake band peripheries.

In the case of the Second Preferred Embodiment, the pair of intermediate arcuate groove segments 246 and 248 are machined such that the grooves are of the same depth throughout. These groove segments are machined by plunging the tool tip to the full depth of the groove at the start of the groove and retracting the tool tip at the end of the groove after the tool tip motion parallel to the brake surface has been arrested.

Test have further shown that the arrangement of groove segments described in each of the embodiments, provides for excellent braking performance as well as providing the major benefit of equal performance regardless of direction of rotation.

The above describes only some embodiments of the present invention and modifications, obvious to those skilled in the art, can be made thereto without departing from the scope of the present invention.

The invention claimed is:

1. A brake disc for a wheeled vehicle; said brake disc including opposing annular braking surfaces; each of said surfaces provided with an identical pattern of disparate arcuate groove segments; said groove segments arranged in groups; each group including at least:
   (a) a pair of inner arcuate groove segments extending outwardly from proximate an inner circumferential edge of a said brake band surface to proximate a mid portion of the width of said brake band,
   (b) a pair of outer arcuate groove segments extending outwardly from proximate a mid portion of the width of said brake band to proximate an outer circumferential edge of said brake band,
wherein said pair of inner arcuate groove segments and said pair of outer arcuate groove segments each include a clockwise arcing and an anticlockwise arcing groove segment; said brake disc providing identical braking performance independent of direction of rotation, and wherein each of the inner arcuate groove segments and each of the outer arcuate groove segments comprises a first end and a second end, and wherein each of the respective inner and outer arcuate groove segments arcs outwardly convexly along an entire length of the respective inner and outer arcuate groove segments from the first end to the second end.

2. The brake disc of claim 1, wherein each of said opposing braking surfaces includes four of said groups of arcuate groove segments; each said group occupying a quadrant of said brake disc.

3. The brake disc of claim 1, wherein respective said clockwise arcing groove segment and anticlockwise arcing groove segment of each of said pair of inner arcuate groove segments and said pair of outer arcuate groove segments are disposed symmetrically about respective radial lines of symmetry.

4. The brake disc of claim 1, wherein said pattern includes a pair of intermediate arcuate groove segments; said pair of intermediate arcuate groove segments disposed symmetrically about a radial line of symmetry.

5. The brake disc of claim 1, wherein said pair of inner arcuate groove segments is machined such that end portions of said groove segments adjacent an inner circumferential edge of said brake band surface gradually increase in depth.

6. The brake disc of claim 1, wherein said pair of outer arcuate groove segments is machined such that end portion of said groove segments adjacent an outer circumferential edge of said brake band surface gradually increase in depth.

7. The brake disc of claim 1, wherein distal ends of said pairs of inner and outer arcuate groove segments are machined such that said grooves are at full depth at said distal ends.

8. A brake disc for a wheeled vehicle; said brake disc including opposing annular braking surfaces; each of said surfaces provided with an identical pattern of disparate arcuate groove segments; said groove segments arranged in groups; each group including at least:
   (a) a pair of inner arcuate groove segments extending outwardly from proximate an inner circumferential edge of a said brake band surface to proximate a mid portion of the width of said brake band,
   (b) a pair of outer arcuate groove segments extending outwardly from proximate a mid portion of the width of said brake band to proximate an outer circumferential edge of said brake band,
wherein said pair of inner arcuate groove segments and said pair of outer arcuate groove segments each include a clockwise arcing and an anticlockwise arcing groove segment; said brake disc providing identical braking performance independent of direction of rotation, and wherein said clockwise arcing groove segment of said pair of outer groove segments is located along an arc defining said clockwise arcing groove segment of said pair of inner arcuate groove segments; said outer groove segment separated from said inner groove segment by a gap.

9. The brake disc of claim 8, wherein each of said arcuate groove segments arcs outwardly convexly.

10. A brake disc for a wheeled vehicle; said brake disc including opposing annular braking surfaces; each of said surfaces provided with an identical pattern of disparate arcuate groove segments; said groove segments arranged in groups; each group including at least:
   (a) a pair of inner arcuate groove segments extending outwardly from proximate an inner circumferential edge of a said brake band surface to proximate a mid portion of the width of said brake band,
   (b) a pair of outer arcuate groove segments extending outwardly from proximate a mid portion of the width of said brake band to proximate an outer circumferential edge of said brake band,
wherein said pair of inner arcuate groove segments and said pair of outer arcuate groove segments each include a clockwise arcing and an anticlockwise arcing groove segment;

said brake disc providing identical braking performance independent of direction of rotation, and wherein an anti-clockwise arcing one of said pair of intermediate arcuate groove segments is located such that its midpoint lies on said arc defining said clockwise arcing groove segment of said pair of inner arcuate groove segments and at a midpoint of said gap separating said outer groove segment from said inner groove segment.

11. The brake disc of claim 10, wherein each of the inner arcuate groove segments and each of the outer arcuate groove segments comprises a first end and a second end, and wherein each of the respective inner and outer arcuate groove segments arcs outwardly convexly along an entire length of the respective inner and outer arcuate groove segments from the first end to the second end.

* * * * *